United States Patent
Swearingen et al.

(10) Patent No.: US 10,053,964 B2
(45) Date of Patent: Aug. 21, 2018

(54) APPARATUS AND METHOD FOR PUNCTURING A PIPE

(71) Applicant: Speciality Earth Sciences, LLC, New Albany, IN (US)

(72) Inventors: Lindsay Swearingen, Floyds Knobs, IN (US); Jason Swearingen, Floyds Knobs, IN (US)

(73) Assignee: Specialty Earth Sciences, LLC, Floyds Knob, IN (US)

( * ) Notice: Subject to any disclaimer, the term of this patent is extended or adjusted under 35 U.S.C. 154(b) by 191 days.

(21) Appl. No.: 15/198,702

(22) Filed: Jun. 30, 2016

(65) Prior Publication Data
US 2018/0003012 A1    Jan. 4, 2018

(51) Int. Cl.
*E21B 43/1185* (2006.01)
*B26F 1/00* (2006.01)
*F16L 55/26* (2006.01)
*F16L 101/00* (2006.01)

(52) U.S. Cl.
CPC .......... *E21B 43/1185* (2013.01); *F16L 55/26* (2013.01); *F16L 2101/00* (2013.01); *Y10T 83/8863* (2015.04)

(58) Field of Classification Search
CPC ............ Y10T 83/0481; Y10T 83/8863; Y10T 83/8858; Y10T 83/384; B23D 27/06; B23D 21/14; B26F 1/0038; B26F 1/0015; F16L 55/26; F16L 2101/00; E21B 43/1185; E21B 43/112; E21B 43/116; E21B 43/117; E21B 43/11852; E21B 43/11857

See application file for complete search history.

(56) References Cited

U.S. PATENT DOCUMENTS

| | | | | |
|---|---|---|---|---|
| 2,495,953 | A * | 1/1950 | Frank | E21B 29/02 166/54.5 |
| 3,393,605 | A * | 7/1968 | Parnell | B63G 7/02 30/180 |
| 3,491,650 | A * | 1/1970 | Rohr | F41A 3/78 42/7 |
| 7,290,474 | B2 * | 11/2007 | Keller | B23D 59/001 192/130 |
| 9,759,047 | B2 * | 9/2017 | Benson | E21B 43/112 |
| 2014/0230641 | A1 * | 8/2014 | Isola | F41A 23/20 89/37.17 |
| 2016/0333675 | A1 * | 11/2016 | Wells | E21B 43/119 |

* cited by examiner

*Primary Examiner* — Phong Nguyen
(74) *Attorney, Agent, or Firm* — Witters & Associates; Steve Witters

(57) ABSTRACT

An apparatus and method for puncturing a pipe in-situ is presently disclosed. The apparatus has an actuator in communication with a remote controller. A firing assembly has a firing chamber and a firing pin, wherein the firing pin is in communication with the actuator. The firing chamber is configured to hold and fire a bullet radially toward the pipe, upon the firing pin being actuated with the actuator. The method includes the steps of inserting a pipe puncturing apparatus into a pipe, activating an actuator, communicating the activation of the actuator to a hammer and moving a firing pin in the hammer to impinge a cartridge and fire a bullet.

16 Claims, 8 Drawing Sheets

APPARATUS AND METHOD FOR PUNCTURING A PIPE

FIELD OF INVENTION

The present invention relates to apparatuses and methods for puncturing pipes.

BACKGROUND OF THE INVENTION

It may be desirable to puncture, open, sever, cut, or penetrate a pipe. Typically, methods of puncturing pipes include drilling through the sidewall of the pipe, cutting a pipe with a blade or saw, or penetrating with a heated lance or point. However, pipe may be installed in an environment wherein access to the pipe at the desired point(s) to be punctured cannot be obtained, thus preventing puncturing the pipe at those desired point(s). For example, a pipe may be installed in close proximity to equipment, devices, walls, or other obstructions preventing access for puncturing by typical methods. Another example may include a pipe installed in the ground, for example a well casing, and thus preventing access for puncturing by typical methods throughout the length of the pipe below grade.

Because of these limitations or disadvantages of the typical apparatuses and methods and the art before, there is a need for improved apparatuses and methods for puncturing pipe.

SUMMARY OF THE INVENTION

One aspect of the present disclosure provides an apparatus for puncturing a pipe in-situ. The apparatus has a support assembly with a length greater than a width, wherein the length is greater than an inner diameter of a pipe to be punctured and the width is less than the diameter of a pipe to be punctured. An actuator is attached to the support assembly and is in communication with a remote controller. A firing assembly is attached to the support assembly and has a firing chamber and a firing pin, wherein the firing pin is in communication with the actuator. The firing chamber is configured to hold and fire a bullet radially toward the pipe, upon the firing pin being actuated with the actuator.

Another aspect of the present disclosure provides a method for puncturing a pipe in-situ comprising loading a pipe puncturing apparatus by removing a bolt from a receiver and inserting a cartridge into a firing chamber in the receiver, wherein the firing chamber is configured to become substantially radially aligned with the pipe upon inserting the pipe puncturing apparatus into the pipe. The bolt is then locked onto the receiver. The pipe puncturing apparatus is inserted into the pipe. An actuator is activated and its activation is communicated to a hammer. The hammer moves a firing pin to impinge a cartridge and fire a bullet from the firing chamber and through the pipe.

A further aspect of the present disclosure provides a pneumatically activated apparatus for puncturing a pipe in-situ. The apparatus has a support assembly, an actuator, a firing assembly having a firing pin in pneumatic communication with the actuator, and a firing chamber configured and disposed to hold a cartridge and a fire bullet radially toward the pipe, upon the firing pin pneumatically moving and impinging upon the cartridge. The actuator, firing assembly, and the firing chamber each being held within an outer perimeter of the support assembly.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION OF THE INVENTION

Figure 1:
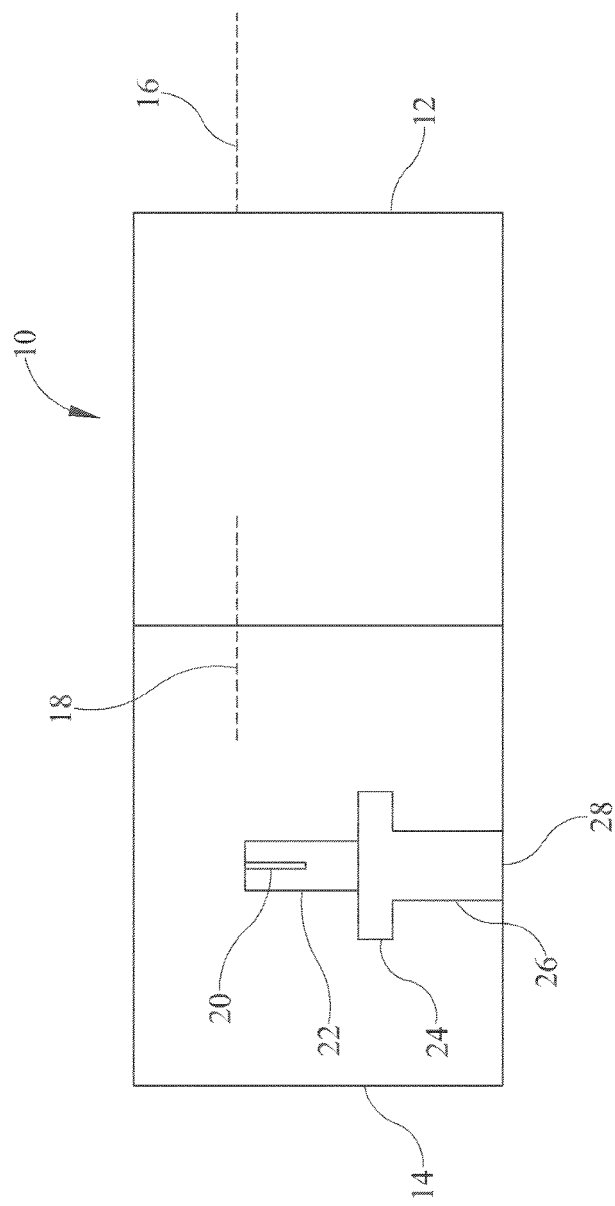
FIG. 1 schematically shows an apparatus for puncturing a pipe of the present disclosure.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods and apparatus related to puncturing pipes and techniques for puncturing pipes in-situ.

Technologies are generally described for apparatuses and methods for puncturing a pipe. The apparatus may be configured to insert a cartridge into a pipe and fire a bullet through the wall of the pipe, at a desired location. The apparatus may be used to puncture a pipe from its interior, and thus may not require access to the exterior of the pipe at the point(s) to be punctured. The apparatus may be advantageous in puncturing pipe that has its exterior obstructed at the point(s) to be punctured. Additionally, puncturing, slicing, cutting, or screening a pipe may reduce the strength and/or integrity of the pipe. As such, it may be advantageous to install a pipe, for example in the subsurface or as a well casing, without punctures, slices, cuts, or screening, and then puncture, cut, slice, etc the pipe after the pipe has been installed in the subsurface.

In one illustrative example, the apparatus is configured to puncture a pipe that is installed in the earth. For example, a pipe may be installed in the earth to function as a well casing. A well casing has its entire outer surface below grade obstructed, virtually illuminating access to its outer surface for puncturing. The presently disclosed apparatus and method may enable the puncturing of an in-situ well casing at point(s) below grade.

The presently disclosed apparatus for puncturing a pipe is configured to be inserted into a pipe and to radially align a cartridge with the wall of the pipe at a desired point. The apparatus is configured to be remotely activated to fire a bullet from the cartridge and through the wall of the pipe. The apparatus may have a configuration to be inserted into curved pipe and/or may be configured to fire in a liquid. For example, the apparatus may be configured to be inserted into a well casing having water therein and fired to puncture the pipe at a desired location.

In describing more fully this disclosure, we make reference to the accompanying drawings, in which illustrative embodiments of the present disclosure are shown. This disclosure may, however, be embodied in a variety of different forms and should not be construed as so limited.

As used herein, the term bolt generally means a cartridge locking mechanism; the term cartridge generally means bullet, casing, primer, and propellant; the term chamber generally means a portion of the receiver that holds the cartridge ready for firing; the term firing pin generally means a mechanism that strikes the primer of the cartridge to initiate ignition of the propellant; the term hammer generally means a device that moves the firing pin to the cartridge; the term muzzle generally means the end of out of which the bullet comes; and the term receiver generally means a unit which receives the cartridge.

FIG. 1 schematically shows apparatus 10 configured for puncturing a pipe of the present disclosure. Apparatus 10 may be configured for puncturing a pipe in-situ. For example, the pipe may be a well casing installed below grade and then punctured to allow the flow through of liquids, vapors, slurries, particles, or combinations thereof. Apparatus 10 may comprise an actuator 12 which may be in communication with a remote controller, not shown, via communication line or device 16. Firing assembly 14 may be in communication with actuator 12, via communication line 18. Firing assembly 14 may comprise a firing chamber 26 and a firing pin 20, wherein the firing pin 20 may be in communication with actuator 12. Firing chamber 26 may be configured to hold a cartridge and fire a bullet radially toward the wall of a pipe, upon firing pin 20 being actuated with the actuator 12. For example, a cartridge may be inserted into firing chamber 26 having its rim supported with cartridge rim support 24. Upon actuating firing assembly 14, with actuator 12, firing pin 20 may move in firing pin sleeve 22 to strike a cartridge in firing chamber 26. Upon firing, a bullet exits muzzle 28. Actuator 12 and firing assembly 14 may be held with a support assembly. Apparatus 10 may be configured to fire a bullet in most any environment. For example, apparatus 10 may be configured to fire a bullet in a liquid, such as water.

Figure 2:
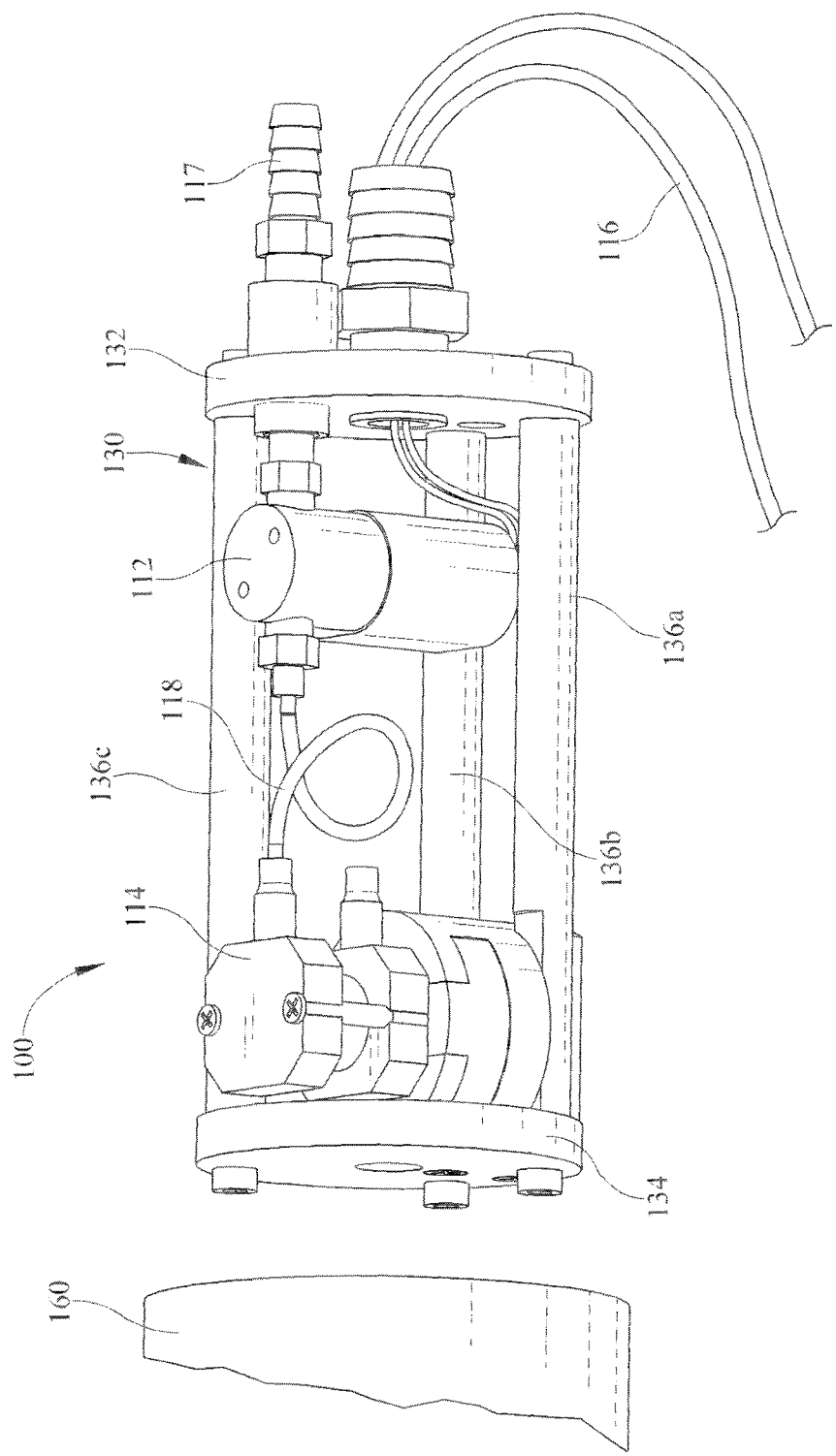
FIG. 2 shows a perspective view of an apparatus for puncturing a pipe of the present disclosure.

FIG. 2 shows a perspective of apparatus 100 configured for puncturing a pipe. Apparatus 100 may be configured for puncturing a pipe in-situ and may comprise a support assembly 130. Support assembly 130 may be configured to support actuator 112 and firing assembly 114. Support assembly 130 may have a length greater than a width. The length of support assembly 130 may be greater than an inner diameter of a pipe to be punctured, 160, and its width may be less than the diameter of the pipe to be punctured, 160. This configuration may provide for insertion of apparatus 100 into pipe 160 and maintain its direction of fire toward the wall of pipe 160. In at least one embodiment, support assembly 130 has a length and outer perimeter configured to be inserted into a curved pipe.

Support assembly 130 may have a variety of configurations for supporting actuator 112 and firing assembly 114. Support assembly 130 may have a first end and a second end, the first end and the second end may be held together in a parallel gap spaced configuration, with support rods for example. The actuator and the firing assembly may both be held between the first end and the second end. Each end may have an outer perimeter less that an inner diameter of pipe 160.

In the illustrative example shown in FIG. 2, support assembly 130 may have a cylindrical configuration. For example, support assembly 130 may have a first end disc 132 and a second end disc 134, first end disc 132 and second end disc 134 may each have an outer diameter less that an inner diameter of pipe 160. Actuator 112 and firing assembly 114 may both be held between first end disc 132 and second end disc 134. For example, support assembly 130 may have one or more support rods, 136a, 136b, and 136c extending between first end disc 132 and second end disc 134. Support rods 136a, 136b, and 136c may be configured and disposed to hold first end disc 132 and second end disc 134 together in a parallel gap spaced configuration. In at least one embodiment, support assembly 130 comprises at least two support rods, 136a, 136b, and/or 136c, extending between first end 132 and second end 134.

Actuator 112 may be attached to support assembly and may be in communication with a remote controller, via communication line 116. For example, communication line 116 may be electrical lines leading to a remote controller for activating actuator 112. Communication line 116 may be representative of a radio controller or other switching or controlling device configured to activate actuator 112. Communication line 116 may be optional as other and different means for activating actuator 112 may be accomplished with the apparatus of the present disclosure. For example, actuator 112 may sense a change in pressure in communication line 117 to be activated.

Firing assembly 114 may be attached to support assembly 130 and may be in communication with actuator 112. For example, firing assembly 114 may have a firing pin in communication with actuator 112. In at least one embodiment of the present disclosure, firing assembly 114 is in communication with actuator 112, via communication line 118.

Figure 3:
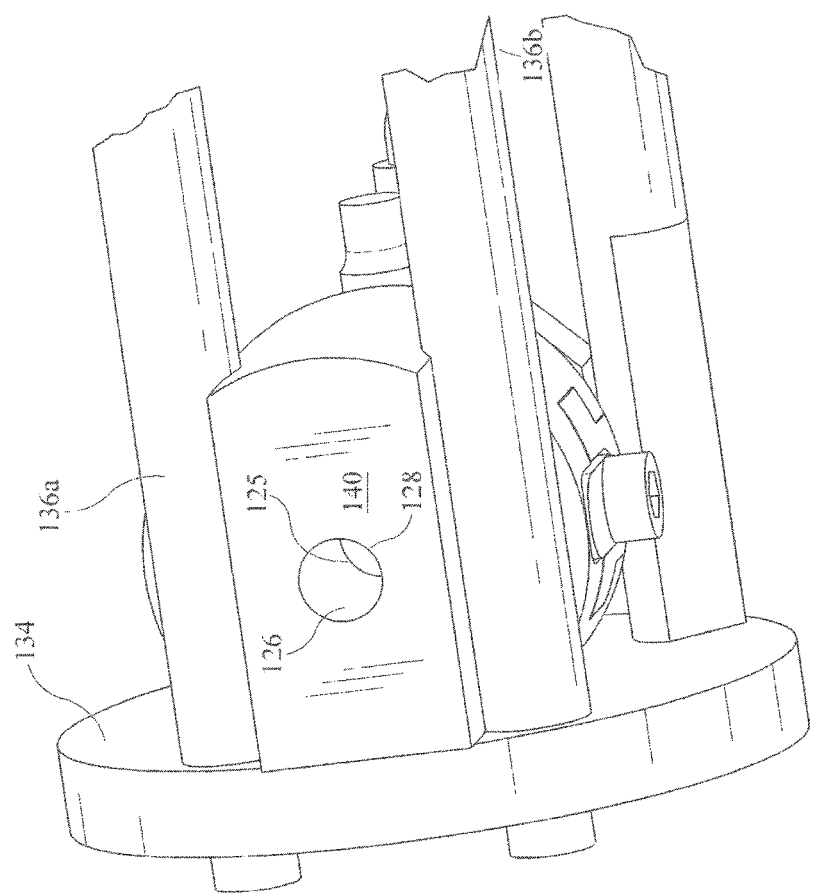
FIG. 3 shows a lower view of a receiver of the apparatus for puncturing a pipe shown in FIG. 2.
Figure 4:
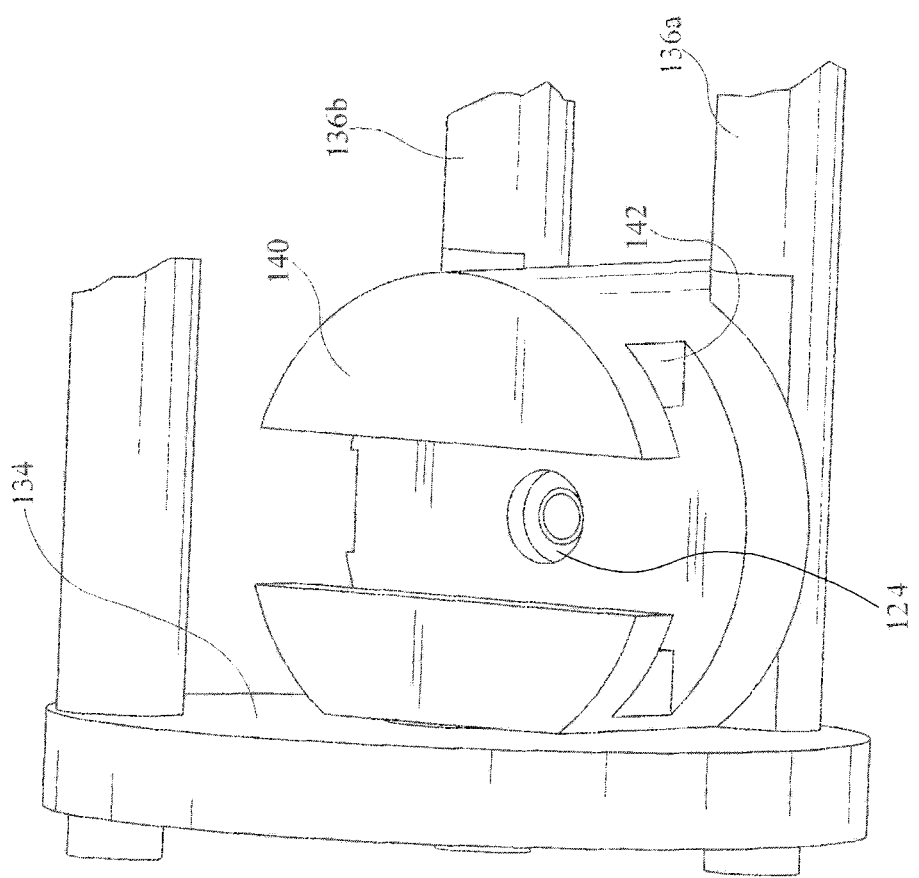
FIG. 4 shows an upper view of the receiver of the apparatus for puncturing a pipe shown in FIG. 2.

FIG. 3 shows a lower view of a receiver 140 and FIG. 4 shows an upper view of receiver 140. Receiver 140 may be held with support rods 136a and 136b, proximate an end wall 134. Receiver 140 may have a "T" slot, 142, configured and disposed to receive a hammer 146, shown in FIG. 5. Receiver 140 may have a firing chamber 126 centrally oriented in "T" slot 142. Firing chamber 126 is configured to hold a cartridge 124 and may be configured to hold and fire a bullet radially toward a pipe, upon a firing pin being actuated with actuator 112. For example, firing chamber 126 may have a cartridge support 125 configured and disposed to hold cartridge 124, about its rim. In at least one embodiment, receiver 140 has firing chamber 126 terminating with muzzle 128. Muzzle 128 may be configured and disposed to become proximate an inner wall of a pipe being punctured. Cartridge support 125 may be formed with a larger upper bore radius of firing chamber 126. Firing chamber 126 may be configured to be loaded with cartridge 124, and unloaded, upon bolt 150 being separated therefrom.

Figure 5:
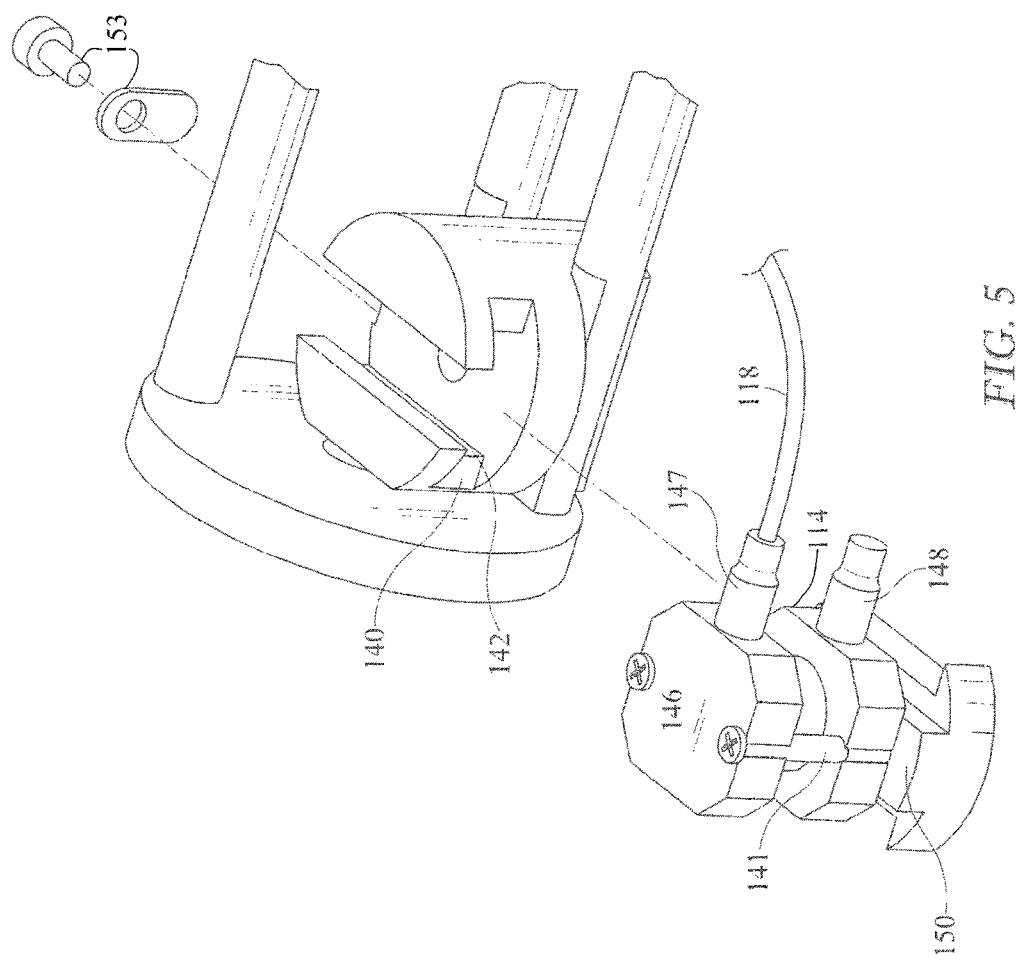
FIG. 5 shows a firing assembly having a hammer and bolt removed from a receiver of the apparatus for puncturing a pipe shown in FIG. 2.

FIG. 5 shows firing assembly 114 having a hammer 146 and bolt 150 removed from receiver 140. Hammer 146 is configured to move a firing pin to impact cartridge 124 and fire a bullet for puncturing a pipe. Hammer 146 may have an inlet port 147 and an outlet port 148. Inlet port 147 may be in flow communication with actuator 112, via flow communication 118. Outlet port 148 may lead to an ambient environment. Hammer 146 may comprise a fluid force cylinder configured to move the firing pin. The fluid may be a gas or liquid and hammer 146 may be a pneumatic or hydraulic solenoid. For example, hammer 146 may have an air force cylinder such as a Clippard AFO Compact Cylinder, e.g. AF-RSR-12-1/2, manufactured by Clippard Instrument Laboratory, Inc., Cincinnati, Ohio Hammer 146 may be removably fastened to a bolt 150, with fasteners 141. Bolt 150 may be removably held in "T" slot 142 with fastener and tab 153.

Figure 6:
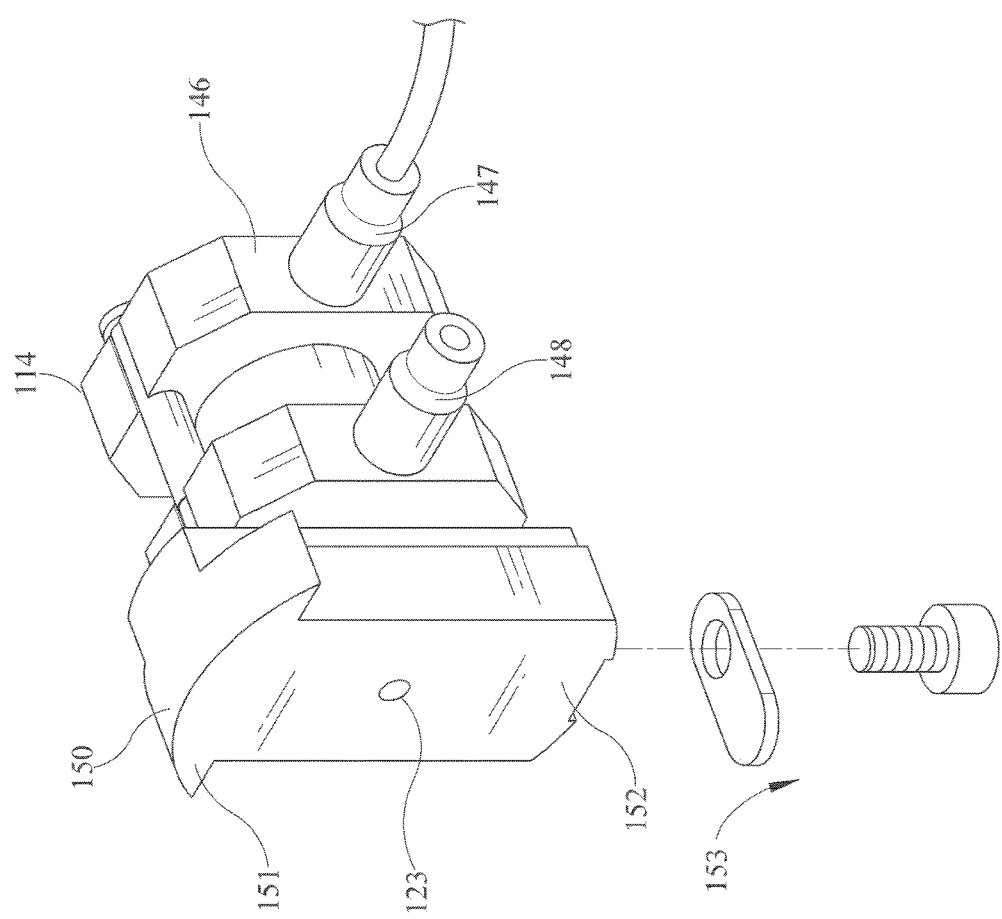
FIG. 6 shows a lower perspective view of the receiver in cooperation with the hammer of the apparatus for puncturing a pipe shown in FIG. 2.

FIG. 6 shows a lower perspective view of bolt 150 in cooperation with hammer 146. Firing assembly 114 may have hammer 146 configured to move a firing pin to impact a cartridge and fire a bullet for puncturing a pipe, a bolt 150 configured to lock and support a cartridge, and a receiver 140 configured to receive the cartridge. Hammer 146, bolt 150, and receiver 140 may be configured to be separably fastened together. As shown in FIG. 5, bolt 150 may be slid from "T" slot 142, upon releasing a fastener and tab 153, shown in FIG. 6. FIG. 6 shows bolt 150 fastened with hammer 146 and in a configuration for actuating a firing pin. Firing pin aperture 123 is configured to receive a portion of firing pin 120, shown in FIG. 7, upon being actuated, and impinge a cartridge. Bolt 150 may have slide 152 configured to slide into "T" slot 142, of receiver 140. Stop 151 may extend outward from slide 152 and may be configured to stop bolt 150 to have firing pin aperture aligned with a cartridge for firing. Bolt 150 may be held in this firing configuration with fastener and tab 153.

Figure 7:
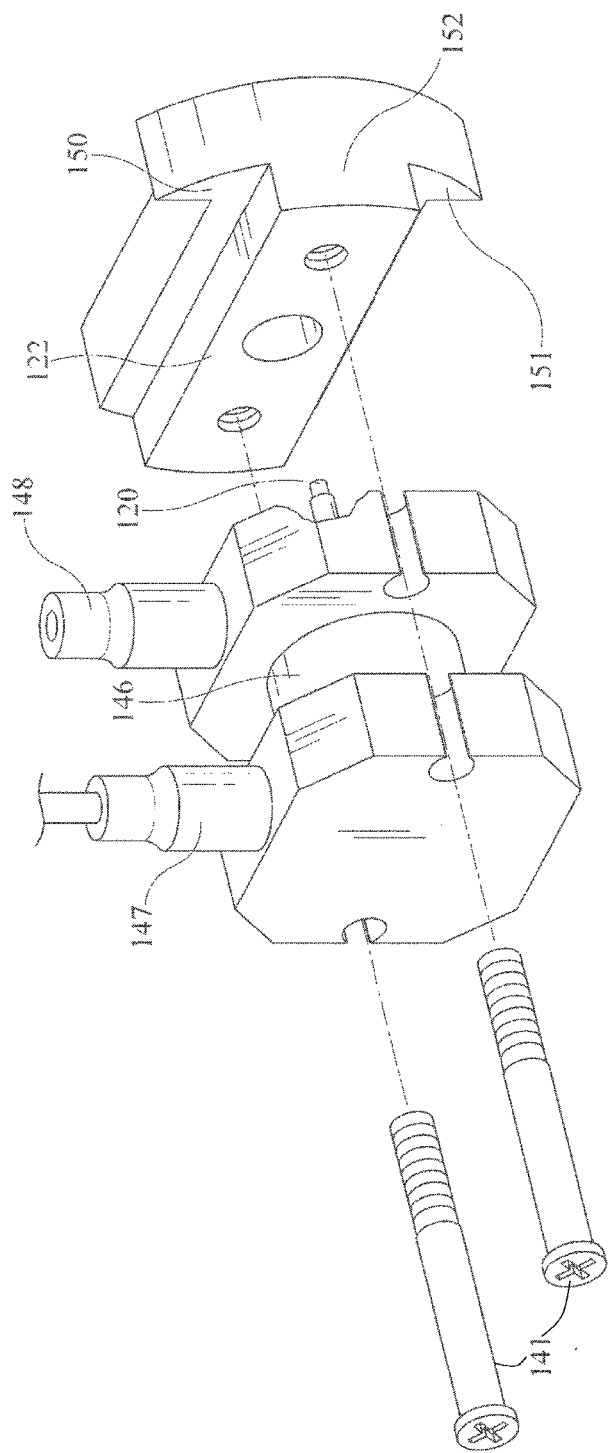
FIG. 7 is a perspective view of the bolt removed from the hammer, showing the firing pin of the apparatus for puncturing a pipe shown in FIG. 2.

FIG. 7 is a perspective view of bolt 150 removed from hammer 146 and shows firing pin 120. Bolt 150 may be removed from hammer 146 by unfastening fasteners 141. Firing pin 120 is disposed with hammer 146 and is configured to move in a firing pin sleeve having aperture 123 and opening 122. The firing pin sleeve and opening 122 may have a larger diameter sleeve portion proximate hammer 146 and a smaller diameter opening to become proximate a cartridge or receiver 140, for example aperture 123. In this configuration, firing pin 120 may have a smaller extension that may extend through aperture 123 and impact a cartridge.

Figure 8:
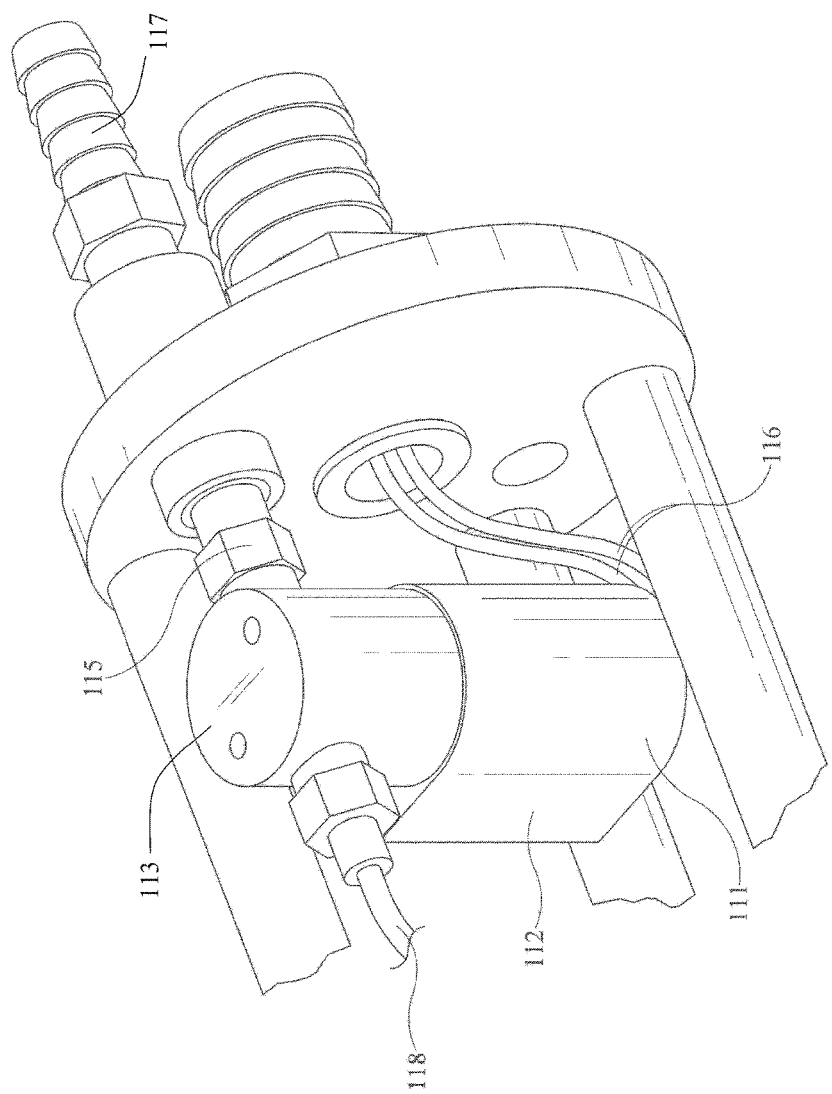
FIG. 8 shows a perspective view of an actuator of the apparatus for puncturing a pipe shown in FIG. 2.

FIG. 8 shows a perspective view of actuator 112. Actuator 112 may have an electronic switching portion 111 and a valving portion 113. Switching portion 111 may be in communication with communication line or controller 116 and valving portion 113. Switching portion 111 may be configured to open a valve in valving portion 113 upon being activated with communication line or controller 116.

Valving portion 113 may have a valve and may have a volume or container for holding a fluid received through inlet port 115. Inlet port 115 may be in flow communication with communication line 117. For example, pressurized air may be fed into valving portion 113, through communication line 117 and inlet port 115, and a volume of pressurized air may be held in a container therein. Upon activation of switching portion 111, a valve in valving portion 113 may be opened and pressurized air may exit valving portion 113 and flow through communication line 118 and to firing assembly 114. The pressurized air may then move firing pin 120 and cause it to strike a cartridge in firing chamber 126.

In at least one embodiment, actuator 112 communicates with firing assembly 114 with a pressurized fluid for moving firing pin 120 and firing cartridge 124. In at least one other embodiment, actuator 112 comprises a pressurized fluid container and a valve. The pressurized fluid container may be in fluid flow communication with firing assembly 114 and a pressurized fluid supply. The pressurized fluid supply may be remote from the apparatus and configured to feed pressurized fluid to the pressurized fluid container. The pressurized fluid may be pressurized air. In at least one embodiment, actuator 112 has a solenoid valve. For example, actuator 112 may have solenoid valve such as a solenoid valve manufactured by Peter Paul of New Britain, Conn.

In at least one embodiment, a pneumatically activated apparatus for puncturing a pipe in-situ is provided. The apparatus may comprise a support assembly 130, an actuator 112, and a firing assembly 114 having a firing pin 120 in pneumatic communication with actuator 112. The firing assembly may have a firing chamber 126 configured and disposed to hold a cartridge and fire bullet radially toward the pipe, upon firing pin 120 being pneumatically moved to impinge upon the cartridge. Actuator 112, firing assembly 114, and firing chamber 126 may each be held within an outer perimeter of support assembly 130. Actuator 112 may be configured to be remotely activated for pneumatically moving firing pin 120.

A method for puncturing a pipe in-situ is presently disclosed. The method comprises loading a pipe puncturing apparatus by removing a bolt from a receiver and inserting a cartridge into a firing chamber in the receiver, wherein the firing chamber is configured to become substantially radially aligned with the pipe upon inserting the pipe puncturing apparatus into the pipe. The method further comprises locking the bolt onto the receiver, and inserting the pipe puncturing apparatus into the pipe. Upon activating an actuator and communicating the activation of the actuator to a hammer, a firing pin is moved in the hammer to impinge the cartridge and fire a bullet from the firing chamber and through the pipe.

The pipe puncturing apparatus may be inserted into a liquid, such as water, in the pipe. The communicating of the activation of the actuator to the hammer may comprise flowing a pressurized fluid from the actuator to the hammer and moving the firing pin. The firing pin may be moved with the pressurized fluid flowing from the actuator. Activating the actuator may comprise receiving a remote signal and opening a valve for the flowing of the pressurized fluid from the actuator to the hammer.

In view of this disclosure, it will be seen that technologies are generally described for an apparatus and method for puncturing pipe. Other and alternative aspects, embodiments, or configurations of the present disclosure may be provided to one having ordinary skill in the art upon reading the present disclosure. For example, various aspects of the present disclosure may provide an apparatus having a plurality of cartridges and be configured to fire a first bullet at a first desired point and a second bullet at a second desired point.

One feature or aspect of an illustrative example is believed at the time of the filing of this patent application to possibly reside broadly in an apparatus for puncturing a pipe in-situ comprising: a support assembly having a length greater than a width, wherein the length is greater than an inner diameter of a pipe to be punctured and the width is less than the diameter of a pipe to be punctured; an actuator attached to the support assembly and in communication with a remote controller; a firing assembly attached to the support assembly and having a firing chamber and a firing pin, wherein the firing pin is in communication with the actuator;

the firing chamber being configured to hold and fire a bullet radially toward the pipe, upon the firing pin being actuated with the actuator.

Another feature or aspect of an illustrative example is believed at the time of the filing of this patent application to possibly reside broadly in an apparatus for puncturing pipe having a support assembly comprising a first end and a second end, the first end and the second end each have an outer perimeter less that an inner diameter of the pipe, and the actuator and the firing assembly are both held between the first end and the second end.

Yet another feature or aspect of an illustrative example is believed at the time of the filing of this patent application to possibly reside broadly in an apparatus for puncturing pipe wherein the actuator communicates with the firing assembly with a pressurized fluid for moving the firing pin and firing the bullet.

Still another feature or aspect of an illustrative example is believed at the time of the filing of this patent application to possibly reside broadly in an apparatus for puncturing pipe wherein the actuator comprises a pressurized fluid container and a valve.

A further feature or aspect of an illustrative example is believed at the time of the filing of this patent application to possibly reside broadly in an apparatus for puncturing pipe wherein the pressurized fluid container is in fluid flow communication with the firing assembly and a pressurized fluid supply.

Another feature or aspect of an illustrative example is believed at the time of the filing of this patent application to possibly reside broadly in an apparatus for puncturing pipe wherein the fluid is air.

Yet another feature or aspect of an illustrative example is believed at the time of the filing of this patent application to possibly reside broadly in an apparatus for puncturing pipe wherein the firing assembly comprises: a hammer configured to move the firing pin to impact a cartridge and fire the bullet for puncturing a pipe; a bolt configured to lock the cartridge in a receiver; and the receiver being configured to receive the cartridge in its firing camber.

Still another feature or aspect of an illustrative example is believed at the time of the filing of this patent application to possibly reside broadly in an apparatus for puncturing pipe wherein the hammer, bolt, and receiver are configured to be separably fastened together.

A further feature or aspect of an illustrative example is believed at the time of the filing of this patent application to possibly reside broadly in an apparatus for puncturing pipe wherein the hammer comprises a fluid force cylinder with an inlet port in flow communication with the actuator and an outlet port.

Another feature or aspect of an illustrative example is believed at the time of the filing of this patent application to possibly reside broadly in an apparatus for puncturing pipe wherein the bolt has a slide configured to slide into a "T" slot in the receiver hold the cartridge in the firing chamber.

Yet another feature or aspect of an illustrative example is believed at the time of the filing of this patent application to possibly reside broadly in an apparatus for puncturing pipe wherein the firing chamber is configured to be loaded with the cartridge and unloaded, upon the bolt being separated from the receiver.

One feature or aspect of an illustrative example is believed at the time of the filing of this patent application to possibly reside broadly in an apparatus for puncturing pipe wherein the support assembly has a length and outer perimeter configured to be inserted into a curved pipe.

Another feature or aspect of an illustrative example is believed at the time of the filing of this patent application to possibly reside broadly in an apparatus for puncturing pipe configured to fire the cartridge in water.

Yet another feature or aspect of an illustrative example is believed at the time of the filing of this patent application to possibly reside broadly in a method for puncturing a pipe in-situ comprising the steps of: loading a pipe puncturing apparatus for puncturing pipe, the loading comprising the steps of: removing a bolt from a receiver; and inserting a cartridge into a firing chamber in the receiver, wherein the firing chamber is configured to become substantially radially aligned with the pipe upon inserting the pipe puncturing apparatus into the pipe; the method further comprising: locking the bolt onto the receiver; inserting the pipe puncturing apparatus into the pipe; activating an actuator; communicating the activation of the actuator to a hammer and moving a firing pin in the hammer to impinge the cartridge and fire a bullet from the firing chamber and through the pipe.

Still another feature or aspect of an illustrative example is believed at the time of the filing of this patent application to possibly reside broadly in a method for puncturing a pipe in-situ wherein the step of inserting the pipe puncturing apparatus into the pipe comprises inserting the apparatus into a liquid in the pipe.

A further feature or aspect of an illustrative example is believed at the time of the filing of this patent application to possibly reside broadly in a method for puncturing a pipe in-situ wherein the step of communicating the activation of the actuator to the hammer comprises flowing a pressurized fluid from the actuator to the hammer and moving the firing pin.

Another feature or aspect of an illustrative example is believed at the time of the filing of this patent application to possibly reside broadly in a method for puncturing a pipe in-situ wherein the step of moving a firing pin in the firing assembly comprises moving the firing pin with the pressurized fluid flowing from the actuator.

Yet another feature or aspect of an illustrative example is believed at the time of the filing of this patent application to possibly reside broadly in a method for puncturing a pipe in-situ wherein the step of activating an actuator comprises receiving a remote signal and opening a valve for the flowing of the pressurized fluid from the actuator to the hammer.

Still another feature or aspect of an illustrative example is believed at the time of the filing of this patent application to possibly reside broadly in a pneumatically activated apparatus for puncturing a pipe in-situ comprising: a support assembly; an actuator; a firing assembly having a firing pin in pneumatic communication with the actuator; a firing chamber configured and disposed to hold a cartridge and fire bullet radially toward the pipe, upon the firing pin pneumatically moving and impinging upon the cartridge; and the actuator, firing assembly, and the firing chamber each being held within an outer perimeter of the support assembly.

A further feature or aspect of an illustrative example is believed at the time of the filing of this patent application to possibly reside broadly in a pneumatic apparatus for puncturing a pipe in-situ of wherein the actuator is configured to be remotely activated for pneumatically moving the firing pin.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

NOMENCLATURE 10 apparatus for puncturing a pipe
12 actuator
14 firing assembly
16 communication of actuator with a remote controller
18 communication of actuator with firing assembly
20 firing pin
22 firing pin sleeve
24 cartridge rim support
26 firing chamber
28 muzzle
100 apparatus for puncturing a pipe
111 electronic switching portion
112 actuator
113 valving portion
114 firing assembly
115 inlet port
116 communication line or remote controller
117 communication line to actuator
118 communication line between actuator and firing assembly
120 firing pin
122 firing pin sleeve and opening
123 firing pin aperture
124 cartridge
125 cartridge support
126 firing chamber
128 muzzle 130 support assembly
132 first end of support assembly
134 second end of support assembly
136a-136c support rods
140 receiver
141 fastener
142 "T" slot
146 hammer
147 inlet port
148 outlet port
150 bolt
151 stop
152 slide
153 fastener and tab
160 pipe

The invention claimed is:

1. Apparatus for puncturing a pipe in-situ comprising:
a support assembly having a length greater than a width, wherein the length is greater than an inner diameter of a pipe to be punctured and the width is less than the diameter of a pipe to be punctured;
an actuator attached to the support assembly and in communication with a remote controller;
a firing assembly attached to the support assembly and having a firing chamber and a firing pin, wherein the firing pin is in communication with the actuator;
wherein the firing chamber is configured to hold and fire a bullet radially toward the pipe, upon the firing pin being actuated with the actuator;
wherein the actuator communicates with the firing assembly with a pressurized fluid for moving the firing pin and firing the bullet; and
wherein the actuator comprises a pressurized fluid container and a valve.

2. The apparatus of claim 1, wherein the support assembly comprises a first end and a second end, the first end and the second end each have an outer perimeter less that an inner diameter of the pipe, and the actuator and the firing assembly are both held between the first end and the second end.

3. The apparatus of claim 1, wherein the pressurized fluid container is in fluid flow communication with the firing assembly and a pressurized fluid supply.

4. The apparatus of claim 3, wherein the fluid is air.

5. The apparatus of claim 1, wherein the firing assembly comprises:
a hammer configured to move the firing pin to impact a cartridge and fire the bullet for puncturing a pipe;
a bolt configured to lock the cartridge in a receiver; and
the receiver being configured to receive the cartridge in its firing camber.

6. The apparatus of claim 5, wherein the hammer, bolt, and receiver are configured to be separably fastened together.

7. The apparatus of claim 6, wherein the hammer comprises a fluid force cylinder with an inlet port in flow communication with the actuator and an outlet port.

8. The apparatus of claim 5, wherein the bolt has a slide configured to slide into a "T" slot in the receiver and hold the cartridge in the firing chamber.

9. The apparatus of claim 5, wherein the firing chamber is configured to be loaded with the cartridge and unloaded, upon the bolt being separated from the receiver.

10. The apparatus of claim 1, wherein the support assembly has a length and outer perimeter configured to be inserted into a curved pipe.

11. The apparatus of claim 1 configured to fire the cartridge in a liquid.

12. A method for puncturing a pipe in-situ comprising the steps of:
loading a pipe puncturing apparatus, the loading comprising the steps of:
removing a bolt from a receiver; and
inserting a cartridge into a firing chamber in the receiver, wherein the firing chamber is configured to become substantially radially aligned with the pipe upon inserting the pipe puncturing apparatus into the pipe;
the method further comprising:
locking the bolt onto the receiver;
inserting the pipe puncturing apparatus into the pipe;
activating an actuator;
communicating the activation of the actuator to a hammer and moving a firing pin in the hammer to impinge the cartridge and fire a bullet from the firing chamber and through the pipe.

13. The method for puncturing a pipe in-situ in claim 12, wherein the step of inserting the pipe puncturing apparatus into the pipe comprises inserting the apparatus into a liquid in the pipe.

14. The method for puncturing a pipe in-situ in claim 12, wherein the step of communicating the activation of the actuator to the hammer comprises flowing a pressurized fluid from the actuator to the hammer and moving the firing pin.

15. The method for puncturing a pipe in-situ in claim 14, wherein the step of moving a firing pin in the firing assembly comprises moving the firing pin with the pressurized fluid flowing from the actuator.

16. The method for puncturing a pipe in-situ in claim 14, wherein the step of activating an actuator comprises receiving a remote signal and opening a valve for the flowing of the pressurized fluid from the actuator to the hammer.

* * * * *